Patented Mar. 11, 1952

2,588,646

UNITED STATES PATENT OFFICE 2,588,646

INSULATING FIREBRICK AND PROCESS OF MANUFACTURE

William A. Miller, Elizabeth, and Temple W. Ratcliffe, Westfield, N. J., assignors to The Babcock & Wilcox Company, Rockleigh, N. J., a corporation of New Jersey No Drawing. Application March 17, 1948, Serial No. 15,496

13 Claims. (Cl. 106—40)

This invention relates in general to improvements in high temperature insulating fire brick and a process of manufacturing the same. More particularly, this invention is concerned with the production of insulating fire brick consisting substantially entirely of a high temperature refractory material, such as pure alumina ($Al_2O_3$), and which are adapted for use at service temperatures in excess of 3000° F.

The general object of our invention is the provision of an improved high temperature insulating fire brick and an economical process of manufacturing the same. A more specific object is the production of an insulating fire brick having a porosity in the range of 55-75% by volume and a permissible service use temperature in excess of 3000° F. A further specific object is the provision of a process of manufacturing an insulating fire brick of the character described having improved methods of chemically bloating the insulator and slop casting the bloated structure.

The various features of novelty which characterize our invention are pointed out with particularity in the claims annexed to and forming a part of this specification. For a better understanding of the invention, its operating advantages and specific objects attained by its use, reference should be had to the accompanying descriptive matter in which we have described preferred embodiments of our invention.

In accordance with our invention, a basic starting mix consisting substantially entirely of a finely divided high temperature refractory material, a small amount of finely divided metal, and only enough water to provide a heavy mud consistency, is rendered fluid and while in a fluid condition is chemically bloated, slop molded until it has a thixotropic set, and the molded shapes dried and fired to a predetermined temperature in excess of the contemplated service temperature, to form an insulator of relatively high porosity and capable of use at service temperatures in excess of 3000° F.

Certain features of our invention are applicable to various non-plastic high temperature refractory materials, such as aluminum, magnesium, beryllium, and zirconium oxides, which when finely ground and mixed with water are of a thixotropic nature. When such mixtures are subjected to a shearing stress, as in rapid mixing, the material will act as a fluid. When the stress is removed, the material assumes the properties of a plastic solid. Finely divided chemically pure alumina ($Al_2O_3$), such as tabular or alpha alumina, is the preferred material of this group for use as the refractory base material in carrying out our invention, and the description and examples included herein are based on that material.

The desired fineness of the alumina, which is preferably tabular or alpha alumina calcined to a temperature above 3000° F., is obtained along with the desired metal content of the starting mix, by milling the alumina in a pulverizer having metallic pulverizing elements of lower hardness than the alumina. Steel balls are ordinarily used for this purpose and are preferable because of the rapid reaction between finely divided iron particles and acids. In the alumina pulverizing process, particles of iron are ground off the pulverizing elements and become dispersed throughout the finely divided alumina. Wet milling of the alumina was found to produce the best results. If the amount of water supplied during pulverization is less than the desired water content of the starting mix, water is added to the pulverized material to bring the water content of the starting mix up to the desired amount. The milling of the alumina is continued for a period indicated by experience as resulting in the desired amount of iron being added to the pulverized material to provide sufficient chemical bloating for the desired porosity of the fired product. In this condition the alumina will have the desired fineness, e. g. 100% through a 200-mesh screen and 87% through a 325-mesh screen.

Fluidity of the starting mix is effected partly by rapidly mixing the starting materials to utilize the thixotropic nature of the mix and partly by the admixture of a suitable deflocculating material, such as by the introduction of a small amount of ammonium dihydrogen phosphate ($NH_4H_2PO_4$) into the pulverizer along with the alumina to be milled.

Chemical bloating of the fluidized or deflocculated mix or alumina, dispersed iron and water, has been found possible by requiring only the addition of a suitable acid, such as concentrated hydrochloric or sulphuric acid, which will have a rapid chemical reaction with the metallic iron contaminations, causing the release of bubbles of hydrogen gas. The slip is simultaneously flocculated causing it to begin to set and entrap the gas bubbles. Only a small amount of iron particles is required for the bloating reaction, e. g. iron amounting to only 0.1% of the alumina by weight is sufficient to produce a brick of approximately 60% porosity if the iron particles are well dispersed. The amount of iron pick-up can be closely regulated by milling the alumina for a predetermined period and thus controlling the amount of iron contamination of the alumina, once the operating characteristics of the pulverizer are known.

The chemical bloating of the mix will produce a structure of widely dispersed small closed cells of uniform size. The cell structure can be advantageously opened and interconnected to some extent by the admixture of a small amount of combustible organic material, such as sawdust, which is subsequently consumed during the firing operation, thus producing a cellular porous fired insulator.

The method of forming insulators of the bloated material is preferably by slop casting the same and utilizing the thixotropic nature of the material to wholly or partly cause it to set in the mold. If a certain amount of the water is removed from the thixotropic starting mix while it is in a plastic condition, the material will not be able to revert to a fluid condition, even if a shearing stress is again applied. Accordingly, if the bloated material is slop cast, for example, in a porous mold in which some of the included water is eliminated, the partly dehydrated material acquires a thixotropic set and the molded shape can be stripped from the mold in a short time and handled.

One example of an insulating fire brick made in accordance with the described process involves the wet ball milling of tabular alumina with a small amount of a defloculating agent, such as 0.45% ammonium dihydrogen phosphate.

$(NH_4H_2PO_4)$

Sawdust and additional water were added and mixed, so that the defloculated slip had the following composition:

|  | Lbs. | Percent by weight |
|---|---|---|
| Tabular alumina (ball milled 5 hrs.) | 2.0 | 36.5 |
| Tabular alumina (ball milled 15 hrs.) | 2.0 | 36.5 |
| Sawdust (4 mesh) | 0.25 | 4.55 |
| $NH_4H_2PO_4$ | 0.025 | 0.45 |
| Water | 1.2 | 22.0 |

To this slip was added and mixed 10 cc. of 36% hydrochloric acid which immediately reacted with the iron contaminations of the alumina to cause the mix to bloat. The proportion of acid used causes it to act also as a flocculating agent, supplementing the thixotropic set of the slip. The slip was slop cast in a porous plaster type mold. The absorption of water from the setting slip is sufficiently rapid that the mold could be stripped in less than one minute. The molded shape was then dried for two hours at 250° F. and while still damp, set in a kiln and fired to 2950° F. for one hour. After firing the slug was easily cut to the desired size. The fired slug had a bulk density of 85.5 lbs./cu. ft., i. e. a porosity of 66%. The firing temperature and time noted is less than the preferred amounts. In general, the firing temperature should be approximately 100° F. above the expected service temperature and held at that temperature for approximately five hours. When fired, for example, at 3200° F. for 5 hrs., the insulators will have a reheat linear shrinkage at 3200° F. less than 3%.

The iron content appears to be completely eliminated during the described process of manufacture. The iron is in the form of a soluble salt after the acid reaction and is carried to the surface of the slug during the drying operation, so that it is either volatilized during the firing operation or removed later when the fired slugs are trimmed to the desired dimensions. The finished insulator is a white brick, showing no trace of iron stain.

In other embodiment of the invention, a water removing agent, such as plaster of Paris, is included in the mix to aid the thixotropic set. Plaster of Paris is particularly suitable for this purpose as it acts also as a hydraulic setting agent to cause a crystalline set. The amount of plaster included is kept to a minimum to avoid undue lowering of the refractoriness of the final product. The inclusion of plaster permits the use of a metal mold in the slop casting operation.

When plaster of Paris is used to promote the set, ammonium dihydrogen phosphate cannot be used as a defloculating agent, nor can hydrochloric acid be used for the bloating reaction, as both constituents would keep the mix from setting. The substitution of sulphuric acid in such a mixture, in addition to carrying out the bloating reaction, has been found to accelerate the plaster of Paris set. This permits a reduction in the amount of plaster necessary to cause rapid setting to a relatively small amount, e. g. 3% of the basic mix by weight. The plaster of Paris should be kept as low as is possible to secure the desired setting time, yet not to unduly decrease the refractoriness of the insulator. Fluidity of the starting mix is obtained in this case by rapid stirring so that the thixotropic nature of the material is utilized, and also by supplying the sulphuric acid in an amount which will have a defloculating effect on the alumina. One slip as cast in accordance with this process had the following composition:

|  | Lbs. | Per Cent by weight |
|---|---|---|
| Alumina (ball milled 15 hrs.) | 4.0 | 70.6 |
| Plaster of Paris (commercial brand) | 0.125 | 2.2 |
| Sawdust (4 mesh) | 0.25 | 4.4 |
| Water | 1.25 | 22.0 |
| Concentrated Sulphuric Acid | .045 | 0.8 |

The bloated mixture was slop poured into an iron mold where it set sufficiently to permit stripping of the mold in five minutes. The molded shapes were dried as previously described and fired to 3000° F. for one hour. The bulk density of the fired product was found to be 63.7 lbs./cu. ft., i. e., a porosity of 74.5%.

The foregoing formula corresponds to a composition having a basic mixture of:

Ball milled tabular alumina _____ 97% by weight
Plaster of Paris _____ 3% by weight To this is admixed:

Sawdust _____ 6.1 % by weight of basic mixture
Water _____ 30.5 % by weight of basic mixture
Concentrated sulphuric acid _____ 0.92% by weight of basic mixture In accordance with our invention, the preferred slip formula for the compositions utilizing plaster of Paris should fall within the following range of constituents:

|  | Per cent by weight |
|---|---|
| Ball Milled Tabular Alumina | 95–100. |
| Plaster of Paris (commercial) | 0–5. |
| Sawdust (4-mesh) | 5–10% of $Al_2O_3$ + Plaster. |
| Water | 20–30% of $Al_2O_3$ + Plaster. |
| Acid | .5–1.5 of $Al_2O_3$ + Plaster. |
| Iron | .05–0.5 of $Al_2O_3$. |

The described process results in a high temperature substantially pure alumina fired product capable of use as an insulating fire brick at service temperatures in excess of 3000° F. Such insulators when made without plaster are capable of service up to 3500° F., and with plaster up to 3300-3400° F. The product is characterized by a substantially uniform cell and pore size, a density less than 4 lbs./9" straight, a high hot load strength, and a porosity ranging from 55-75%.

While in accordance with the provisions of the statutes we have described herein the best forms of the invention now known to us, those skilled in the art will understand that changes may be made in the compositions and process of manufacture disclosed without departing from the spirit of the invention covered by our claims, and that certain features of the invention may sometimes be used to advantage without a corresponding use of other features.

We claim:

1. The method of manufacturing a high temperature insulating fire brick which comprises milling a highly calcined non-plastic refractory material with ferrous pulverizing elements of lower hardness than the refractory material for a period sufficient to finely pulverize the refractory material and disperse therein a small amount of ferrous particles, forming a thixotropic slip containing the milled refractory material and water, chemically bloating the slip by chemically reacting the included ferrous particles with acid to evolve hydrogen in the slip, casting the slip in a mold while absorbing water from the slip to effect a thixotropic set, and drying and firing the molded shape.

2. The method of manufacturing a high temperature insulating fire brick which comprises forming a thixotropic slip containing a calcined non-plastic refractory material and a small amount of iron particles dispersed therein, chemically bloating the slip by chemically reacting the included iron particles with acid to evolve hydrogen in the slip, slop casting the slip in a mold while absorbing water from the slip to effect a thixotropic set, and drying and firing the molded shape.

3. The method of manufacturing a high temperature insulating fire brick which comprises milling highly calcined chemically pure alumina with ferrous pulverizing elements of lower hardness than the alumina for a period sufficient to finely pulverize the alumina and disperse therein a small amount of ferrous particles, deflocculating a thixotropic slip containing the milled alumina, chemically bloating the deflocculated slip by chemically reacting the included ferrous particles with acid to evolve hydrogen in the slip, slop casting the slip in a mold while absorbing water from the slip to effect a thixotropic set, and drying and firing the molded shape.

4. The method of manufacturing a high temperature insulating fire brick which comprises milling highly calcined chemically pure alumina with ferrous pulverizing elements of lower hardness than the alumina for a period sufficient to finely pulverize the refractory material and disperse therein a small amount of ferrous particles, deflocculating a thixotropic slip containing the milled alumina, combustible organic material and water, chemically bloating the deflocculated slip by chemically reacting the included ferrous particles with concentrated hydrochloric acid to evolve hydrogen in the slip, slop casting the slip in a mold while absorbing water from the slip to effect a thixotropic set, and drying and firing the molded shape at a temperature sufficient to burn out the included organic material.

5. The method of manufacturing a high temperature insulating fire brick which comprises milling a highly calcined non-plastic refractory material with ferrous pulverizing elements of lower hardness than the refractory material for a period sufficient to finely pulverize the refractory material and disperse therein a small amount of ferrous particles, forming a slip containing the milled refractory material, chemically bloating the slip by chemically reacting the included ferrous particles with acid to evolve hydrogen in the slip, slop casting the slip in a mold while absorbing water from the slip to effect a thixotropic set, drying and firing the molded shape, and mechanically removing the soluble iron salts collecting on the surface of the shape.

6. The method of manufacturing a high temperature insulating fire brick which comprises milling a highly calcined non-plastic refractory material with ferrous pulverizing elements for a period sufficient to finely pulverize the refractory material and disperse therein a small amount of ferrous particles, mixing a slip of the milled refractory material, plaster of Paris, and water, chemically bloating the slip by chemically reacting the included ferrous particles with acid to evolve hydrogen in the slip, slop casting the slip in a mold while effecting a thixotropic and crystalline set of the mixture, and drying and firing the molded shape.

7. The method of manufacturing a high temperature insulating fire brick which comprises milling alpha alumina with ferrous pulverizing elements for a period sufficient to finely pulverize the alumina and disperse therein a small amount of ferrous particles, mixing a slip of the milled alumina, plaster of Paris, and water, chemically bloating the slip by chemically reacting the included ferrous particles with acid to evolve hydrogen in the slip, slop casting the slip in a mold while effecting a thixotropic and crystalline set of the mixture, and drying and firing the molded shape.

8. The method of manufacturing a high temperature insulating fire brick which comprises milling alpha alumina with ferrous pulverizing elements for a period sufficient to finely pulverize the alumina and disperse therein a small amount of ferrous particles, mixing a slip of the milled alumina, plaster of Paris, combustible organic material and water, chemically bloating the slip by chemically reacting the included ferrous particles with sulphuric acid to evolve hydrogen in the slip, slop casting the slip in a mold while effecting a thixotropic and crystalline set of the mixture, and drying and firing the molded shape at a temperature sufficient to burn out the included combustible organic material.

9. The method of manufacturing a high temperature insulating fire brick which comprises wet milling chemically pure alumina with ferrous pulverizing elements for a period sufficient to finely pulverize the alumina and disperse therein a small amount of ferrous particles, mixing a slip of the milled alumina, plaster of Paris, combustible organic material and water, chemically bloating the slip by chemically reacting the included ferrous particles with sulphuric acid to evolve hydrogen in the slip, slop casting the slip in a mold while effecting a thixotropic and crystalline set of the mixture, drying and firing the molded shape at a temperature sufficient to burn out the included combustible organic material, and mechanically removing the soluble iron salts collecting on the surface of the shape.

10. The method of manufacturing insulating fire brick which comprises milling refractory material with metallic pulverizing elements of lower hardness than the refractory material for a period sufficient to finely pulverize the material and disperse therein a small amount of metal particles, chemically bloating a slip containing the material by chemically reacting the included metal particles with an acid to evolve hydrogen in the slip, and molding the bloated slip.

11. The method of manufacturing insulating fire brick which comprises milling refractory material with ferrous pulverizing elements of lower hardness than the refractory material for a period sufficient to finely pulverize the material and disperse therein a small amount of ferrous particles, and chemically bloating a slip containing the material by chemically reacting the included ferrous particles with an acid to evolve hydrogen in the slip.

12. The method of manufacturing insulating fire brick which comprises milling non-plastic refractory material with ferrous pulverizing elements of lower hardness than the refractory material for a period sufficient to finely pulverize the material and disperse therein a small amount of ferrous particles, chemically bloating a thixotropic slip containing the material by chemically reacting the included ferrous particles with an acid to evolve hydrogen in the slip, and effecting a thixotropic set of the bloated slip.

13. An insulating fire brick consisting of the fired residue of a molded shape of a chemically bloated mixture of tabular alumina, iron, sawdust, water and an acid in approximately the following proportions:

| | |
|---|---|
| Alumina | 95–100% by weight |
| Plaster of Paris | up to 5% by weight |
| Sawdust | 5–10% by weight of alumina and plaster |
| Water | 20–30% by weight of alumina and plaster |
| Acid | 0.5–1.5% by weight of alumina and plaster |
| Iron | .05–0.5% by weight of alumina and plaster |

WILLIAM A. MILLER.
TEMPLE W. RATCLIFFE.

REFERENCES CITED

The following references are of record in the file of this patent:

UNITED STATES PATENTS

| Number | Name | Date |
|---|---|---|
| 1,027,004 | Schwerin | May 21, 1912 |
| 1,050,303 | Schwerin | Jan. 14, 1913 |
| 2,073,138 | Bale | Mar. 9, 1937 |
| 2,136,096 | Benner et al. | Nov. 8, 1938 |
| 2,340,194 | McMullen | Jan. 25, 1944 |
| 2,463,979 | Langrod | Mar. 8, 1949 |

FOREIGN PATENTS

| Number | Country | Date |
|---|---|---|
| 16,525 | Great Britain | 1896 |
| 662,204 | Germany | 1938 |